Feb. 13, 1968     H. G. THRASHER     3,368,807
VIBRATION ISOLATOR

Filed Jan. 19, 1966     2 Sheets-Sheet 1

INVENTOR.
HOWARD G. THRASHER
BY
Ernest L. Brown
ATTORNEY

INVENTOR.
HOWARD G. THRASHER
BY
Ernest L. Brown
ATTORNEY

United States Patent Office 3,368,807
Patented Feb. 13, 1968

3,368,807
VIBRATION ISOLATOR
Howard G. Thrasher, Los Angeles, Calif., assignor to Litton Systems, Inc., Beverly Hills, Calif., a corporation of Maryland
Filed Jan. 19, 1966, Ser. No. 521,637
1 Claim. (Cl. 267—35)

ABSTRACT OF THE DISCLOSURE

The invention pertains to a vibration isolator. A fluid container is sealed at least at one end thereof by a resilient member supporting a shaft therethrough. Slidably mounted between spaced abutments on the shaft within the container is a cylindrical dasher member. Vibrations are absorbed both by the resilient member and the dasher member moving through fluid in said container.

---

This invention pertains to a mechanical vibration isolator or shock mount, and particularly such a device which has variable damping.

A spring without a damper has excellent isolating characteristics at frequencies substantially above the resonant frequency of the mass-spring combination. When a fluid damper such as an air damper or a liquid damper is attached to the spring, the isolating characteristics at high frequencies are degraded. At the resonant frequency of the spring and its attached mass, the excursion of the mass and the transmitted vibration across the isolator builds up to a very large amplitude. The use of a damper limits the amplitude of excursion of the supported mass at frequencies near the resonant frequency of the mass-spring-damper combination.

The device contemplated by this invention has characteristics of a spring at small excursions of the supported mass and has the characteristics of a damped spring for larger excursions of the supported mass. Thus, the damping limits excursions of the supported mass in the regions of the resonant frequency of the mass-spring-damper system and limits excursions, by virtue of the attenuation characteristics of the mass spring combination, at higher frequencies. Further, the damper damps the transmission of shocks.

It is therefore an object of this invention to isolate shock and vibration.

It is another object of this invention to support a mass by a spring during small excursions of said mass and to support said mass by a spring-damper during large excursions of said mass.

It is a further object of this invention to provide apparatus having a substantially smooth transition between a mass-spring system and a mass-spring-damper system.

It is a more specific object of this invention to provide a vibration isolator having a fluid container with a damping fluid therein and a resilient means for supporting the mass, and a damper within the fluid which is variably coupled to the spring and mass.

Other objects will become apparent from the following description, taken in connection with the accompanying drawings in which.

Figure 1:
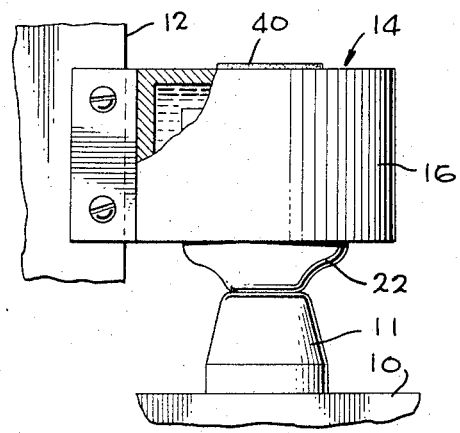
FIGURE 1 is a profile view, partly in section, of a first embodiment of the invention.
Figure 2:
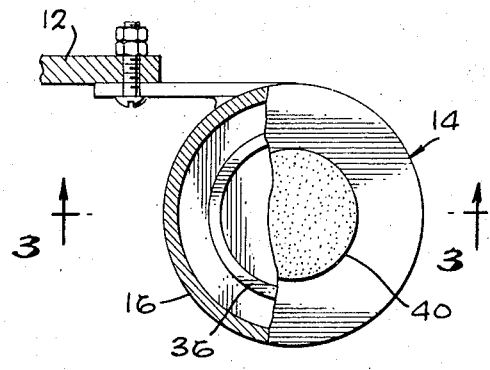
FIGURE 2 is a view taken from the top in FIGURE 1.
Figure 3:
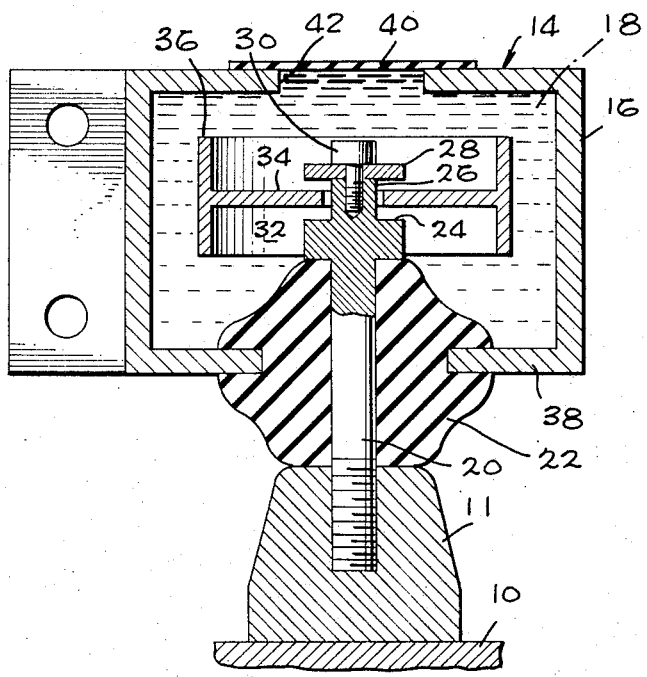
FIGURE 3 is a section view, taken at 3—3 in FIGURE 2.

In FIGURES 1, 2, and 3, a mass 12 is supported relative to a supporting structure, such as a vehicle 10, by means of a vibration isolator 14 which is fabricated in accordance with this invention.

The vibration isolator 14 comprises a fluid container 16 which contains damping fluid. A resilient means 22 forms a portion of at least one wall of the container 16. A dasher 36 engages the damping fluid 18 and is coupled to the driving member 20. The amount of coupling between the dasher 36 and the driving member 20 increases with the amplitude of excursion of the driving member 20.

The damping fluid 18 may be a gas or a liquid. In a preferred embodiment of the invention, the damping fluid 18 is oil.

The driving member 20 is attached to the supporting vehicle 10 by means—for example—of a coupling 11.

The resilient spring 22 is fabricated—for example—of rubber and forms a part of at least one wall 38 of chamber 16.

The driving member 20 has a shoulder 24 positioned thereon and a reduced diameter 26 upon which the damper 36 is slidingly engaged. A washer 28 forms a second stop for motion of the damper 36 and is held in place by means of a screw 30.

The damper 36 has a web 34 and a right circularly cylindrical wall or rim 32. The web 34 slidingly engages the portion 26 of the shaft or driving member 20. The portion of the web 34 which engages the shaft at 26 forms an orifice allowing the flow of some of the damping fluid to move from one surface to the other of the web 34. Clearance is also provided for the fluid to move externally of the cylinder 32.

The upper wall 42 of the container 16 has an elastic relief member 40 which is attached thereto to relieve pressures generated in the fluid 18.

Figure 4:
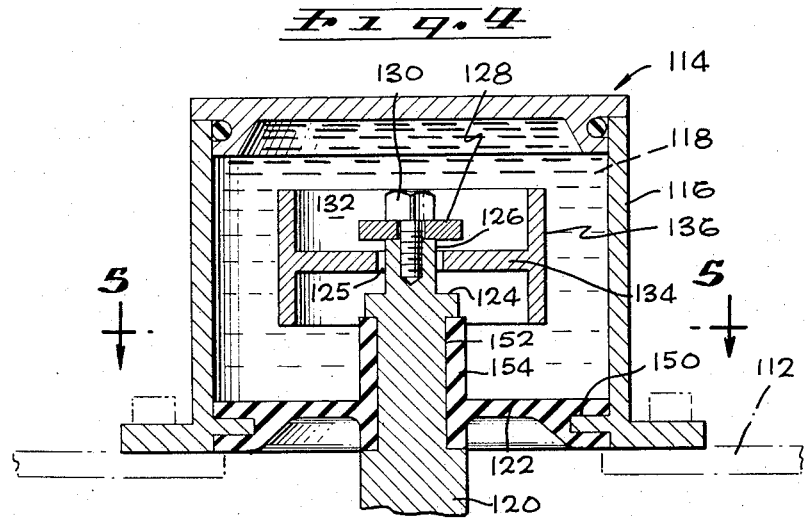
FIGURE 4 is a section view of a second embodiment of the invention.
Figure 5:
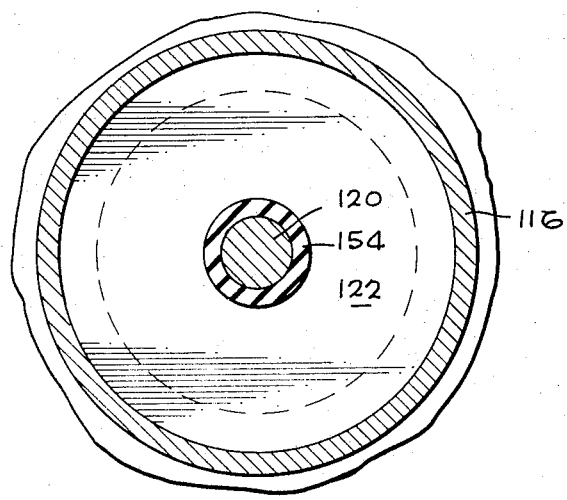
FIGURE 5 is a sectional view taken at 5—5 in FIGURE 4.

In the embodiment of FIGURES 4 and 5, the spring 122 is shown in the form of a washer which engages the container 116 at 150 and which engages the driving member 120 at 154. Because of the relative thinness of the wall of member 122, compared to the spring member 22 of the embodiment in FIGURE 3, no additional relief member such as relief member 40 is needed in the second embodiment. The rest of the device of FIGURES 4 and 5 is similar to the device of FIGURES 1, 2, and 3 except for the presence of a lid.

In operation, vibration and shock is transmitted by driving members 20 or 120 through springs 22 or 122 to the supported mass 12 or 112. As the amplitude of excursion of driving members 20 or 120 increases relative to the supported mass 12 or 112, the shoulders 24 or 124 and 28 or 128 engage the web 34 or 134 of the dasher 36 or 136. The dasher 36 or 136 engages the damping fluid 18 or 118 which absorbs energy and damps the vibration. If the driving member 20 or 120 moves toward the web 34 or 134 at a high rate, the damper 36 or 136 becomes partially coupled through the fluid to the driving member.

In addition to the highly damped arrangement where the dasher 36 or 136 is very tightly coupled to the driving member 20 or 120, some damping occurs by virtue of the direct contact or coupling between springs 22 or 122 and the damping fluid 18 or 118.

Thus, at small excursions the mass 12 or 112 is supported relative to the driving member 20 or 120 substantially by a spring means 22 or 122. As the excursion becomes greater, the spring means 22 or 122 begins to engage the fluid 18 or 118. As the excursion becomes even greater, the shoulders 24 and 124 and the shoulders 28 and 128 narrow the gap between the web 34 or 134 and the adjacent shoulders on the driving members 20 or 120. The rest position of the dasher 36 or 136 is indeterminate. As the amplitude of the excursion of the driving member 20 or 120 becomes even greater, the shoulders 24 and 124, as well as the shoulders or washers 28 and 128, engage the web 34 or 134 of the dasher 36 or 136 to create a high degree of damping of the motion of the driving member.

In the embodiment of FIGURES 4 and 5 a separate spring (not shown) may be positioned in parallel with member 122 and member 122 may be weakened as so constructed, member 122 would become a pressure-relief member similar to that shown at 40 and the device of FIGS. 4 and 5 would be a variable damper.

Although the invention has been described in detail above, it is not intended that the invention should be limited by that description, but only in accordance with the spirit and scope of the appended claim:

1. A vibration isolator for providing a substantially pure spring restraint between relatively moveable members at low frequencies and small relative excursions, a spring restraint coupled with a modicum of fluid damping at higher frequencies, and a spring restraint coupled with a greater fluid damping where the relative excursions exceed a given range comprising: a closed fluid tight container having rigid walls adapted to be coupled to one of said members, a damping fluid completely filling said container, one of said rigid walls provided with an opening sealed by a stretchable material for relieving fluid pressure within the container, a resilient solid spring member forming a portion of another wall of said container opposite to said opening, a shaft projecting through said solid resilient spring member and having a portion extending outside the container adapted to be connected to the other member and a portion projecting inside said container, said shaft portion inside the container having an integral section with an enlarged cross section followed by an integral section of smaller cross section terminating at the inner end of said shaft located inside the container, a disc of greater cross section than said reduced cross section of the shaft removably fastened at the inner end of said shaft, said section of enlarged cross section and said disc providing a pair of shoulders separated by the section of the shaft having a reduced cross section, a right circular cylindrical dasher member coaxially disposed with respect to the shaft and provided with a transverse web having a central opening slightly larger than the reduced cross sectional portion on the shaft, said web being slideable fitted over said reduced section of the shaft with the reduced section of the shaft passing through the opening thereof, said cylindrical dasher member being coaxially arranged with respect to said opening in the wall of the container and having a single degree of sliding freedom along the shaft axis intermediate the shoulders provided by said shaft section of enlarged cross section and said disc, the opening formed in said web being sufficiently larger than the reduced cross section of the shaft to provide a degree of fluid coupling therebetween at high frequency excursions between said shaft and web, and said resilient solid spring member provided with a relatively large surface area in contact with the fluid filling the container thereby to provide a degree of fluid damping for low frequency excursions between said members.

References Cited

UNITED STATES PATENTS

| | | |
|---|---|---|
| 1,953,128 | 4/1934 | Peteler. |
| 2,380,899 | 7/1945 | Strachovsky. |
| 2,387,066 | 10/1945 | Harding _____ 248—22 X |
| 3,107,752 | 10/1963 | McLean _____ 248—358 X |
| 3,196,988 | 7/1965 | Wasdell _____ 188—100 |

FOREIGN PATENTS

| | | |
|---|---|---|
| 1,087,201 | 8/1954 | France. |

FERGUS S. MIDDLETON, *Primary Examiner.*

MILTON BUCHLER, *Examiner.*

G. E. HALVOSA, *Assistant Examiner.*